No. 870,065.  
PATENTED NOV. 5, 1907.  
A. R. & F. S. WELCH.  
GAS ENGINE.  
APPLICATION FILED MAY 29, 1905.

2 SHEETS—SHEET 2.

WITNESSES  
J. F. Massey  
Lotta Lee Hayton.

INVENTORS  
Albie R. Welch  
Fred Stinson Welch  
By Parker & Burton Attorneys.

UNITED STATES PATENT OFFICE.

ALLIE R. WELCH AND FRED STIMSON WELCH, OF PONTIAC, MICHIGAN.

GAS-ENGINE.

No. 870,065.    Specification of Letters Patent.    Patented Nov. 5, 1907.

Application filed May 29, 1905. Serial No. 262,780.

*To all whom it may concern:*

Be it known that we, ALLIE RAY WELCH and FRED STIMSON WELCH, both citizens of the United States, residing at Pontiac, county of Oakland, State of Michigan, have invented a certain new and useful Improvement in Gas-Engines, and declare the following to be a full, clear, and exact description of the same, such as will enable others skilled in the art to which it pertains to make and use the same, reference being had to the accompanying drawings, which form a part of this specification.

This invention relates to gas engines, and the object of our improvements, is to provide an improved apparatus for controlling the intake and exhaust.

Figure 1:
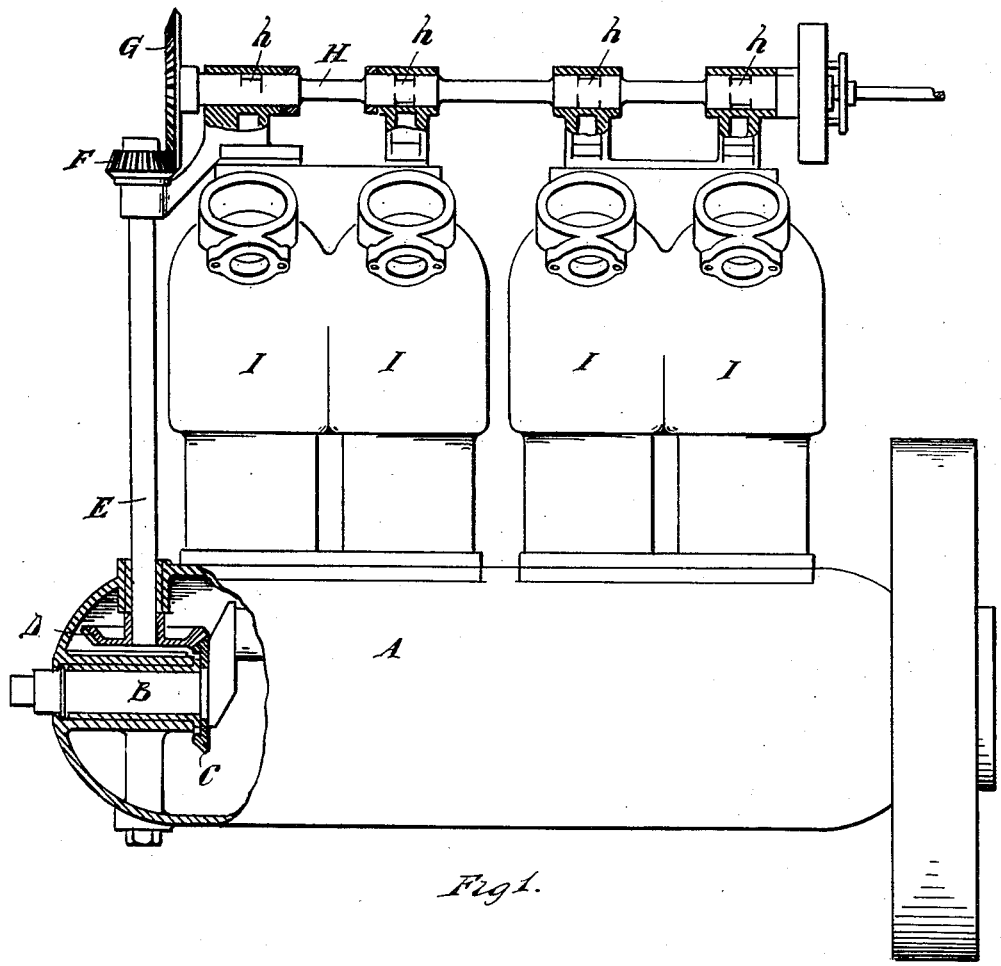
Figure 2:
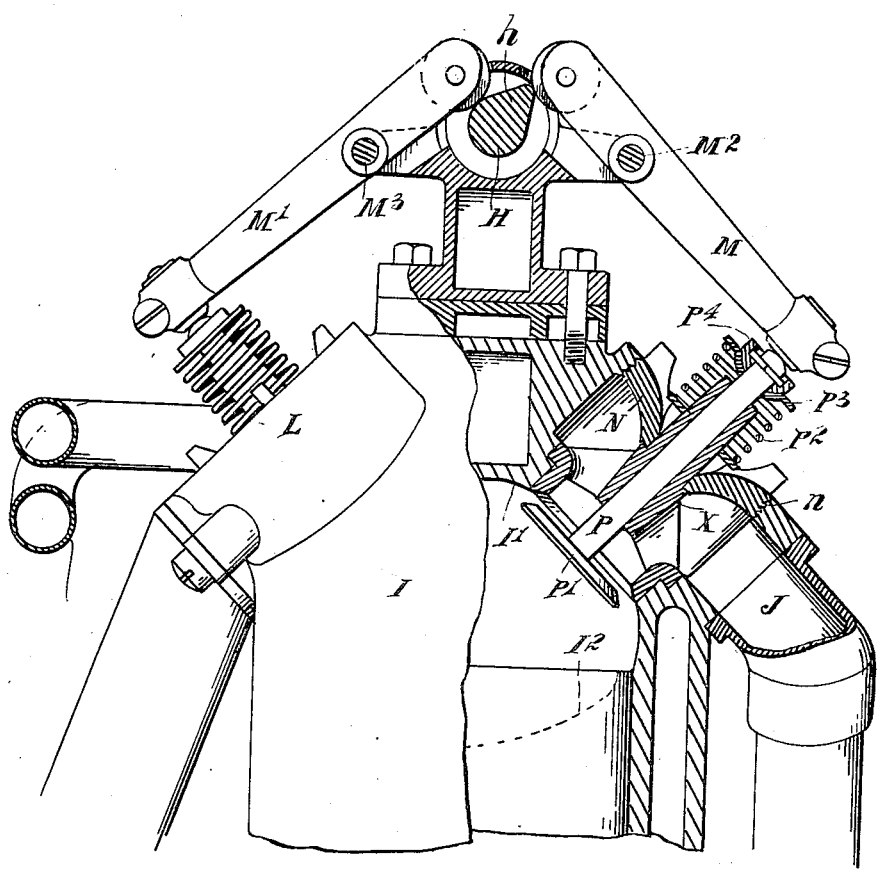
Figure 3:
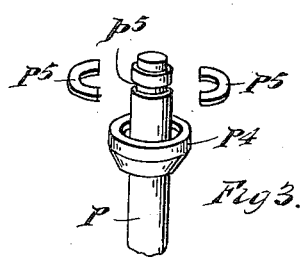

In the drawings:—Figure 1, is a side elevation of a gas engine, embodying my invention, partly in section. Fig. 2, is an elevation, to an enlarged scale, partly in section, showing the upper part of one of the cylinders with the valve actuating mechanism attached thereto. Fig. 3, is a detail illustrating the construction of the upper part of the valve stems.

I, I, I, I, are the cylinders of a gas engine; A, is the crank case; B, is the main shaft of the engine in one of the bearings; C, is a beveled gear wheel upon the shaft B; D, is a beveled gear wheel meshing with the beveled gear wheel C.

E, is a vertical shaft extending in the neighborhood of the shaft B to the top of the cylinders, I, I, I, I, at one end of the engine. The beveled gear wheel D is keyed upon the shaft E.

F, is a beveled gear wheel upon the upper end of the shaft E.

H, is a shaft extending horizontally above the cylinders, I, I, I, I, and resting in bearings supported by said cylinders.

G, is a beveled gear wheel upon one end of the shaft H meshing with the beveled gear wheel F.

The relative size of the gear wheels C, D, F, G, are such that when the shaft B shall actuate the shaft H, the latter will have one-half the angular velocity of the former. The shaft H is provided with a cam $h$ above each of the cylinders, I, I, I, I. The interior surfaces of the cylinders, I, I, I, I, at their ends are formed approximately as segments of the surfaces of a sphere, as indicated at I', Fig. 2. The end of the piston is also hollowed out to approximately a spherical form, as indicated at $I^2$, in Fig. 2.

J, is the inlet port. P, is the valve stem, and $P^1$, the valve disk of the inlet valve.

N, is the nut for securing the inlet valve cage in position, said nut is provided with screw threads $n$ adapted to engage the corresponding threads in the cylinders, I, I, I, I, to hold the cage X and valve in place.

L, is the exhaust valve having the same construction in detail as the inlet valve just described.

The shaft H is located above the centers of the cylinders, I, I, I, I, and the valves P and L, are located upon opposite sides of the shaft H, and at such an angle and position that their disks shall form approximately a portion of the surfaces of the interior of the cylinders I, I, I, I, at this place.

M, $M^1$, are levers adapted to operate the valves P and L, pivoted at $M^2$ and $M^3$, and provided with friction rollers at their inner ends, adapted to be contacted by the cam $h$, as the shaft H is revolved. The levers M and $M^1$ are so located relative to the shaft H that the single cam $h$ upon said shaft above each cylinder shall operate the exhaust and inlet valves at the proper time by contacting the friction rollers, of the respective levers. The relative length of the two arms of each lever, and the position of the pivot may be so chosen as to give the valve the proper lift, and duration and time of opening.

$P^2$, is a coil spring about the valve stem P, resting at one end against the nut N, and at the other end against a sheet metal disk $P^3$, which is struck out to form an annular flange adapted to receive the end of the spring $P^2$, and inclosing a part hollowed out to form a portion of the surfaces of a sphere.

$P^4$, is a sheet metal cup adapted to pass down over the stem P and to fit within the hollow of the disk $P^3$.

$p^5$, is an annular groove at the upper end of the valve stem P.

$P^5$, $P^5$, (Figs. 2 and 3) are segments of a ring divided across its diameter and adapted to be placed within the groove $p^5$ and to protrude from said groove.

To put the spring in position to operate the valve stem, it is passed around said stem with its lower end resting upon the nut N, and the disk $P^3$ is placed above it as indicated in Fig. 2; the cup $P^4$ is then placed over the disk $P^3$ and is pressed down carrying the disk with it below the groove $P^5$, as indicated in Fig. 3. The two segments $P^5$, $P^5$, are then placed within the groove $p^5$ and the cup $P^4$ is allowed to rise, inclosing the segments, as indicated in Fig. 2, and holding them in position. The segments $P^5$ therefore act as a key holding the upper end of the spring $P^2$. The hemispherical form of the disk $P^3$ and the cup fitting into it admit automatic adjustment of the valve upon its seat.

It will be observed that by the above construction, the valves are so located as to form a part of the wall of the combustion chamber as near as may be considering the flat surface of the valves and so that a single cam upon the shaft H shall properly operate both valves, and that the form of the wall of the combustion chamber is such as to make the ratio of the wall area to the inclosed volume a minimum.

The valve mechanism is easily taken apart, and is such as to bring the valve always evenly upon its seat. The angular position of the valves to make their surfaces approximate to the form of part of the curved wall surface brings the stems into proper position to be actuated by the levers and by the single cam $h$. The position of the valves, and ports and the construction of the cages insures a free exhaust, and allows a charge to be taken into the cylinder freely and with but slight heating of the same by contact with the walls.

What we claim is:—

In a gas engine, the combination of a cylinder having an interior wall at its head end in the approximate shape of a portion of the surface of a sphere, an inlet and an exhaust valve forming parts of said wall when closed, each of said valves being provided with a stem extending at right angles thereto, one of said valves being located upon one side of said axis and the other upon the other side thereof, a shaft adapted to be actuated by the engine, said shaft being located upon the head of said cylinder adjacent, and approximately at right angles, to the axis of said cylinder, a single cam upon said shaft, and levers pivoted upon said cylinder and adapted to contact the valve stems and to be contacted by said cam to secure the proper timing and operation of said valves.

In testimony whereof, we sign this specification in the presence of two witnesses.

ALLIE R. WELCH.
FRED STIMSON WELCH.

Witnesses:
FLORENCE S. LOCKWOOD,
FLORA McLEAN.